United States Patent [19]

Merriam et al.

[11] Patent Number: 5,311,581

[45] Date of Patent: * May 10, 1994

[54] REMOTE METER READING METHOD AND APPARATUS

[75] Inventors: David P. Merriam; Dale L. Scott, both of Albuquerque; Bryan F. Scott, Rio Rancho, all of N. Mex.

[73] Assignee: Sparton Corporation, Jackson, Mich.

[ * ] Notice: The portion of the term of this patent subsequent to Apr. 23, 2008 has been disclaimed.

[21] Appl. No.: 970,265

[22] Filed: Nov. 2, 1992

Related U.S. Application Data

[63] Continuation of Ser. No. 686,684, Apr. 17, 1991, Pat. No. 5,161,182, which is a continuation of Ser. No. 333,117, Apr. 4, 1989, Pat. No. 5,010,568.

[51] Int. Cl.[5] .......................................... H04M 11/00
[52] U.S. Cl. .................................... 379/107; 379/106; 379/97; 340/870.02
[58] Field of Search ............... 379/107, 106, 102, 104, 379/105, 97; 340/870.02, 870.03

[56] References Cited

U.S. PATENT DOCUMENTS

| | | | |
|---|---|---|---|
| 4,571,691 | 2/1986 | Kennon | 340/545 |
| 4,804,957 | 2/1989 | Selph et al. | 340/870.03 |
| 5,010,568 | 4/1991 | Merriam et al. | 379/106 |

Primary Examiner—Curtis Kuntz
Assistant Examiner—Stella L. Woo
Attorney, Agent, or Firm—Reising, Ethington, Barnard, Perry & Milton

[57] ABSTRACT

A remote meter reading system has equipment at a telephone company office coupled by modems to a utility company computer which issues requests for customer data. Telephone test trunks are used to access individual meter sites and initiate meter readings using a number of single frequency bursts. Meter sending units emit a pulse for each unit of consumption and a microprocessor counts the pulses in RAM to derive separate meter readings. When interrogated, the microprocessor outputs the readings in a binary coded decimal format to a DTMF tone generator which emits each decimal number as a tone pair which is transmitted via the telephone line and is detected at the telephone company, translated into ASCII code and transmitted by modem to the utility computer.

6 Claims, 4 Drawing Sheets

REMOTE METER READING METHOD AND APPARATUS

This is a continuation of application Ser. No. 07/686,684, filed on Apr. 17, 1991, now U.S. Pat. No. 5,161,182, which is a continuation of application Ser. No. 07/333,117, filed on Apr. 4, 1989, now U.S. Pat. No. 5,010,568.

FIELD OF THE INVENTION

This invention relates to the method and apparatus for automatic meter reading by telephone and particularly to meter data encoding method and apparatus for remote meter reading.

BACKGROUND OF THE INVENTION

It is generally desirable for utility companies to collect meter reading information from homes or commercial establishments without visually inspecting every meter at its resident location. The traditional labor intensive collection system is too expensive to be maintained and the accuracy of the data collected is subject to considerable error. A number of proposals for remote meter reading have been made and some have been put into operation. One system which has been tried uses a radio link with the meter and a mobile radio unit which is driven around selected neighborhoods to collect data from local meters. This requires manned operation of the mobile units and thus is a compromise which uses less labor than the traditional data collection method. Still another system for remote meter reading uses telephone communication between the utility company and the meters to be read. The present invention pertains to this category.

Telephonic meter reading systems have long been proposed without commercial success although in recent times there has been a renewal of commercial attempts which seek to capitalize on improving telephone communication technology. In general, these systems incorporate a modem in each residential unit to receive interrogation signals from the telephone line and to formulate and transmit meter readings via the telephone line to the utility company. Such modems have come into widespread use for telephone communication and are characterized by two traits: they are expensive and unreliable as communication devices. Even though a modem might accurately produce signals representing the data to be transmitted, the signals are in such a form that, due to noise interference or limited system fidelity, they are not faithfully transmitted over normal telephone lines. Some systems use communication devices which may not be recognized as modems, yet the transmission reliability is questionable. Some representative patented systems are described below.

The U.S. Pat. No. 3,842,218 to DeLuca et al describes a system for remote meter reading by telephone which uses a modem (FIG. 5) at the meter site for initiating the interrogation of meters upon receiving a command signal and generating a series of tones to communicate the meter consumption information. The meters have decades supplying signals on ten lines to the tone generator which yields data in decimal form.

The U.S. Pat. No. 3,868,640 to Binnie et al discloses a remote meter reading system using telephony. In one version using a frequency division multiplex basis, a unit at the meter site has four tone decoders and an interrogation signal comprising up to four simultaneous frequencies is evaluated by the unit for prompting a response. In another version using a time division multiplex basis, a single tone decoder is used and the interrogation signal comprises a binary code made up of a series of single frequency tones each representing a "1" or "0". In either version the unit responds by transmitting the meter readings in the form of a series of tones of the same frequency.

The U.S. Pat. No. 3,842,206 to Barselotti et al shows a remote meter reading system having a meter unit which transmits meter readings as a serial binary pulse train. Each bit in the pulse train comprises either of two frequencies representing a "1" or a "0".

The U.S. Pat. No. Re. 26,331 to Brothman et al discloses a remote meter reading system having a unit at the meter site for transmitting a coded meter reading in the form of a modulated AC signal in one version or in the form of serial binary pulses interspersed with synchronization pulses in another version.

U.S. Pat. No. 4,587,536 to Oliver et al granted Mar. 25, 1986, discloses a meter reading system including interface means between the meter and telephone line for sending AC signals to the central office in response to an interrogation signal. Plural multiplexers are provided at the central office for multiplexing the signals between a group of telephone lines and central office. A computer selects a multiplexer and one of the telephone lines and a continuous DC and AC coupling is established to the telephone line during on-hook conditions. The interface means generates DTMF signals corresponding to the meter reading value which are transmitted over the telephone line to the central office.

The Lumsden U.S. Pat. No. 4,388,690 granted (Jun. 14, 1983, discloses an automatic meter reading transponder. The transponder includes a CPU connected to a receiver and transmitter and a real time clock is connected to the CPU. The CPU receives the input pulses representative of electric power consumption. The RAM of the CPU has a plurality of addressable registers wherein the CPU equates each register sequentially with a predetermined time period. Each register contains a count which is representative of the power consumed during the associated time period.

SUMMARY OF THE INVENTION

It is therefore an object of the invention to provide an inexpensive meter reading and data transmitting apparatus for a telephonic automatic meter reading system.

It is another object of the invention to provide an exceptionally reliable method of meter reading and telephonic data transmission.

The invention is also carried out in a remote meter reading system having telephone communication of meter data by a meter telephone unit comprising; terminals for connection to a telephone line, means coupled to the terminals for initiating a meter reading operation, control means for acquiring data and furnishing data in response to initiation of meter reading, and a DTMF tone generator coupled to the terminals and to the control means for receiving the data from the control means and for producing a set of tone pairs representing the data for transmission over the line.

In accordance with this invention, an improved transponder is provided for use in an automatic meter reading system of the type which utilizes the telephone system for transmission of meter readings. The transponder comprises a microprocessor including a read/write memory. A meter pulse generating means is coupled with a meter and produces a meter pulse corresponding to a unit of measurement. The microprocessor is normally in a quiescent mode and is switched to an active mode in response to a meter pulse. The microprocessor is programmed to count pulses and to store the pulse count in the read/write memory and to switch the microprocessor to the quiescent mode after the pulse count is stored. A detecting means detects a control signal on the telephone line and the microprocessor is switched from the quiescent mode to an active mode in response to the control signal. The microprocessor is programmed to produce a tone generator signal for a DTMF tone generator in response to receipt of a control signal. The tone generator produces a sequence of tone pairs representing a pulse count stored in the read/write memory and the microprocessor is switched to the quiescent mode after the sequence of tone pairs is produced.

Further, in accordance with the invention, the transducer is powered by supply voltage on the telephone line except when a fault occurs on the line or the telephone is off-hook and then it is powered by a battery in the transducer which supplies an auxiliary supply voltage. Battery power is conserved and yet the integrity of pulse counting is assured by maintaining the microprocessor in the quiescent state except when a meter pulse is generated. Further, battery power is conserved by utilizing for meter pulse generation a Wiegand sensor which requires no power supply.

A more complete understanding of the invention may be obtained from the detailed description that follows taken with the accompanying drawings.

DESCRIPTION OF THE PREFERRED EMBODIMENT

A remote meter reading system is intended to provide the various utility companies with a cost effective and timely method of collecting billing information. Integrity of the collected information is of paramount importance. By using telephony as the data collection medium, a system is available for nearly every utility customer. The utility company needs special equipment at its central office for interfacing with the telephone company equipment as well as equipment at each home, business or other meter site for automatically collecting meter data. By providing suitable flexibility in the equipment, other functions such as tamper detection and remote disconnect can be provided.

Referring now to the drawings, there is shown an illustrative embodiment of the invention in an automatic meter reading system wherein the transmission of meter reading data from the meter site is initiated by an interrogation signal from the telephone company. It will be appreciated, as the description proceeds, that the invention is also applicable in a meter reading system wherein the transmission of meter reading data is initiated by a suitable unit at the meter site. It will become apparent to those skilled in the art that the invention may be practiced in many different forms and may be utilized in a variety of applications.

Figure 1:
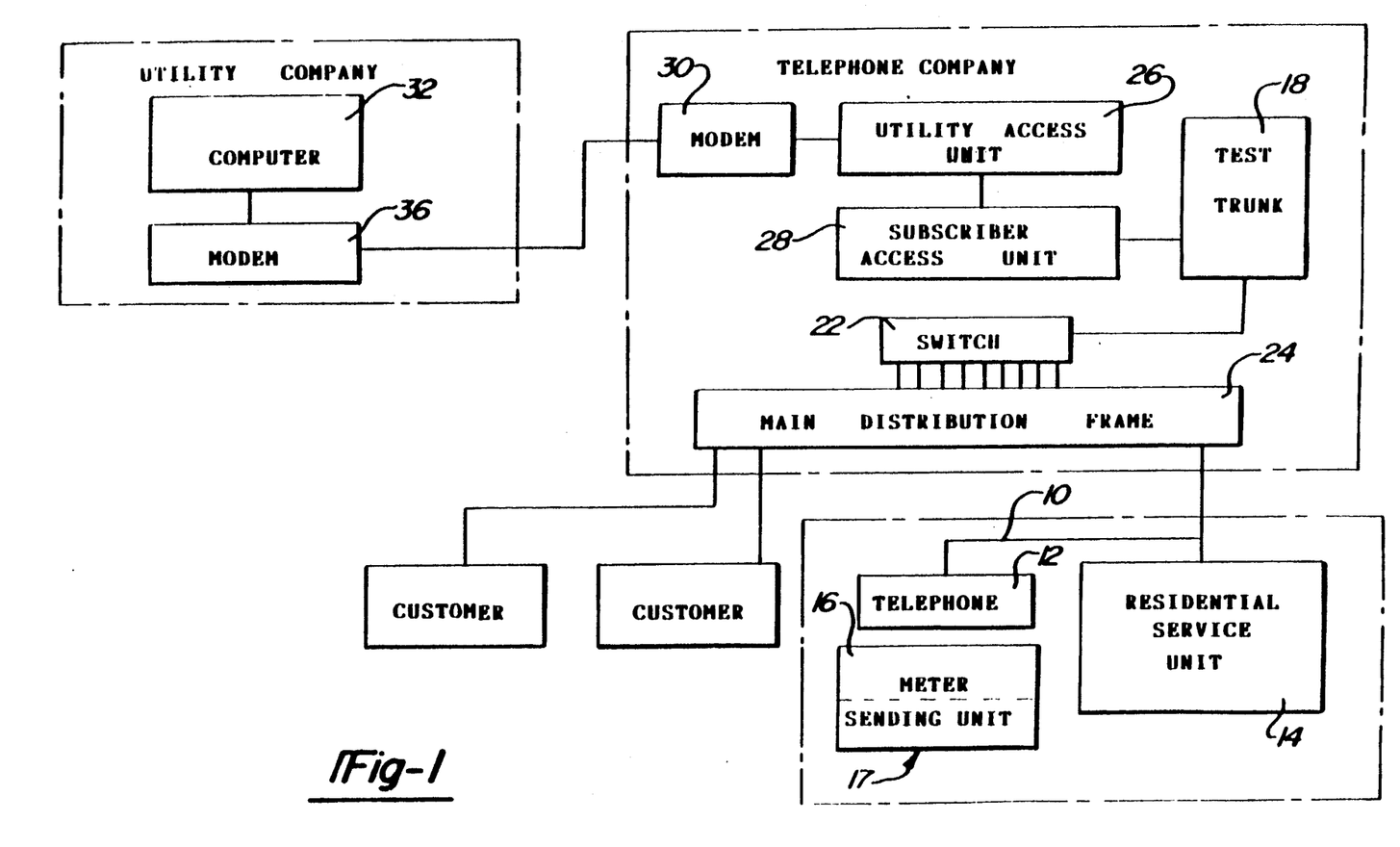
FIG. 1 is a block diagram of an automatic meter reading system incorporating a meter unit according to the invention.

As indicated in FIG. 1, the system is distributed among the utility company, the telephone company and the customers of the utility company. The customer has an incoming telephone line 10 connected to a conventional telephone 12 and to a transponder comprising a residential services unit 14 (RSU) and one or more sending units 17. Each sending unit is coupled with a utility meter 16. The telephone 12 may be the same telephone used by the telephone company subscriber for conventional voice communication over the telephone system. The telephone company has a test trunk 18 which is provided for the purpose of accessing individual telephone lines without ringing the phones to test line resistance and other aspects of the telephone equipment. This same test trunk is used to access the individual RSU's 14 to carry out meter reading and related functions. The test trunk 18 is connected to the customer lines 10 through a switch 22 and a main distribution frame 24. The telephone company also houses a utility access unit (UAU) 26 which is connected to the test trunk 18 through a subscriber access unit (SAU) 28 and is connected to the utility company through a modem 30. The UAU 26 accepts requests from the utility, obtains data, and transmits the data to the utility. The (SAU) 2 8 accesses customer RSU's 14 over the test trunk 18 when commanded by the utility access unit 26. The utility has a computer or terminal 32 coupled through a modem 36 to the telephone company modem 30.

The meter reading system interrogates the RSU 14 at each meter site and communicates meter data to the utility company computer for billing purposes without interfering in any way with the customer's service. The utility computer 32 requests meter readings using account numbers or telephone numbers; this communication is over the dial-up network using commercial modems 36, 30. In response to the request the UAU 26 instructs the SAU 28 to access the customer RSU 14 via the test trunk 18 (i.e., without ringing). The SAU 28 will not access the customer's telephone line if it is in use (busy). Also the RSU 14 incorporates a "busy detect" function that causes the system to release the line whenever the customer picks up the telephone. The SAU 28 commands the RSU 14 to transmit meter readings, reset registers, etc., by sending a control signal including a command signal comprising a sequence of single frequency tone bursts on the telephone line. The RSU 14 responds with DTMF (dual tone multifrequency or "touchtone" signalling) to the SAU 28. Data communicated from the RSU to the SAU is check-summed to ensure data integrity. Following command execution, the RSU automatically assumes a quiescent mode. The SAU has a digit receiver with frequency selective filters to detect the DTMF tones. The DTMF data received from the RSU is translated into ASCII and sent to the UAU which forwards it to the utility computer 32. The SAU communicates with the UAU in ASCII format using serial RS232C protocol.

The system is designed to work with commonly used meters of the ordinary unencoded type or the encoded type. Appropriate meter interfaces or sending units are provided as separate assemblies to provide flexibility in packaging as well as the ability to accommodate a large number and variety of meters. Unencoded meters may have magnetic pickups added. The sending units make all meters compatible with the RSU 14 and all meters are read in the same manner. In particular, the sending unit issues a voltage pulse to the RSU for each unit of consumption. In accordance with this invention, a special sending unit is provided, as will be described subsequently.

Figure 2:
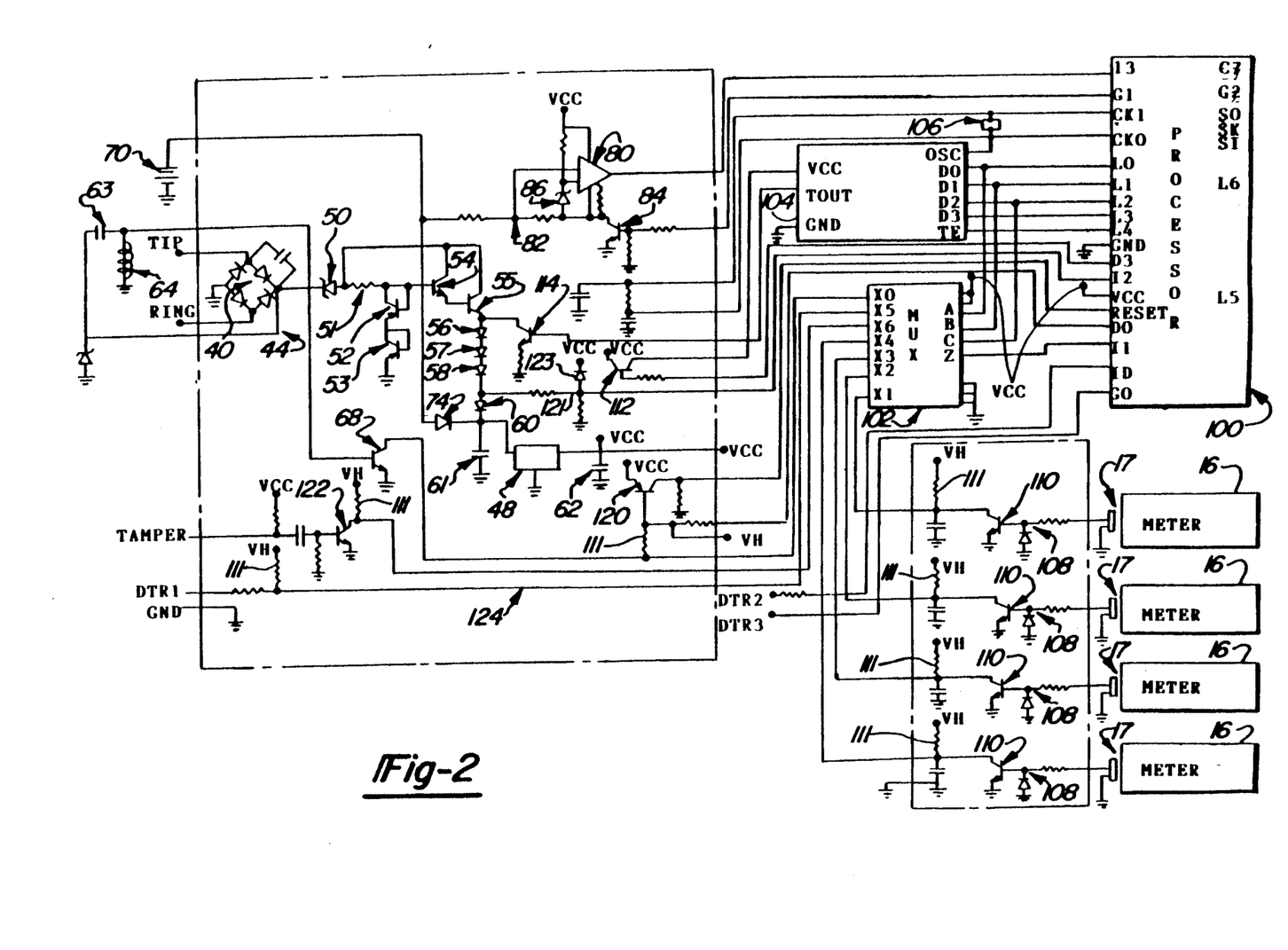
FIG. 2 is a schematic circuit diagram of the meter unit according to the invention.

The RSU 14 shown in FIG. 2 has a line interface comprising tip and ring terminals for connection to the telephone line 10 and a diode bridge 40 having its input connected to the terminals and its output connected to ground and a positive line 44. A 250 volt zener diode 46 is connected across ground an line 44 for transient suppression. The bridge assures that the voltage output is independent of the telephone line 10 polarity. The nominal voltage into the terminals is 48 volts. The line 10 furnishes power to the RSU.

A voltage regulator 48 and power switch circuitry furnish a regulated voltage Vcc. A 24 volt zener diode 50 and a resistor 51 couple the positive line 44 to the collector and base of a transistor 52 while the emitter is coupled to the collector and base of a transistor 53 which is configured as a 14 volt zener diode connected at one side to ground. A pair of Darlington connected transistors 54, 55 have the input base connected to the resistor 51, their collectors connected to the anode of the diode 50 and their output emitter connected through four serially connected diodes 56, 57, 58 and 60 to the input of the regulator 48. The regulator has a terminal connected to ground and capacitors 61 and 62 are connected between the regulator 48 input and output, respectively, and ground. The elements 50 through 60 drop the 48 volt input voltage to approximately 11.5 volts for input to the voltage regulator which maintains an output Vcc of a constant 5 volts.

A tone selective filter, comprising a capacitor 63 and an inductor 64, is serially connected between the line 44 and ground have a junction point connected to the base of a transistor 68. The filter is tuned to the control signal frequency of 1633 Kh.

For backup purposes a 9 volt lithium battery 70 maintains continued operation of the RSU when telephone line power is not available to the input of the voltage regulator 48. This occurs when there is a failure of voltage supply on the telephone line and also when the telephone is off-hook as will be described subsequently. The battery 70 is connected between ground and the input of the regulator 48 through a diode 74. As long as there is power from the telephone line 10, the voltage at the regulator 48 input is higher than the voltage at the anode of the diode 74 and all power will be supplied by the line 10. When the telephone line is removed or the voltage drops below 24 volts the diode 74 will conduct to supply battery power to the regulator 48.

A low battery detect circuit includes an operational amplifier 80; it also provides a voltage divider 82 and a transistor 84 serially coupled between the battery 70 and ground. A zener diode 86 is connected between an input of the operational amplifier 80 and the collector of the transistor 84 to provide a reference voltage at the operational amplifier when the transistor 84 is turned on. The transistor 84 is normally turned off, creating approximately the same voltage on all inputs of the operational amplifier 80 keeping it turned off. Power is turned on to the operational amplifier only when the transistor 84 is turned on to obtain a reading and then a reference voltage is placed on one input of the operational amplifier. The voltage on the other input (derived from battery voltage) is compared to the reference voltage and when the battery voltage is low the output of the operational amplifier is low.

A processor 100 such as a COP840C microprocessor is coupled to the circuitry described above. It is also coupled to meters 16 and other inputs through a multiplexer 102 (MUX) such as a CD451/22B multiplexer and to a DTMF tone generator 104 such as a TP5088 generator which transmits the RSU output data. The processor 100 includes a RAM, i.e., a read/write memory, and is operated under control of a program stored in its ROM. The processor 100 has ports GND and Vcc for power supply connection, clock ports CKI and CKO connected to a crystal 106 for clock input, a port GI connected to the base of transistor 84 to turn on the low battery detect circuit, and a port I3 connected to the output of operational amplifier so to receive the low battery signal. Processor ports L0 through L4 are connected to inputs of the tone generator 104. Ports L0, L1 and L2 are also connected to the selector ports A, B and C of the multiplexer 102. The multiplexer has one data output port which is coupled to port I1. A RESET port activates the processor when a voltage is applied to the port through a transistor 120. A latching port DO coupled to the base of the transistor 120 can be energized by the processor to latch the RESET on. A port I2 is connected to a voltage divider 121 which is connected to the junction of diodes 58 and 60 to sense the presence of voltage at that point. The normal voltage is 4.2 volts and is limited to 5.7 volts maximum by a clamping circuit including a diode. The voltage is lost if the line voltage goes below the 24 volt level of the zener diode 50. When the telephone is off-hook, i.e. in use, the reduced voltage on the telephone line will be blocked by zener diode 50 and the voltage at port I2 will be at logic low and this prevents port D3 from going high. This in turn, prevents any tone generator output.

As shown in FIG. 2, there are four meter sending units 17 in the illustrative meter reading system. Each sending unit 17 is associated with a different meter, the meters being numbered 1, 2, 3 and 4. Each of the meter sending units is of a special type which requires no power supply and has no moving parts. It is well adapted for retro fitting on existing meters, especially the conventional water meter and gas meter which use a separate rotary hand indicator or number wheel indicator for each decimal digit in the reading. The sending unit uses a Wiegand sensor which is commercially available from the Sensor Engineering Company of Hamden, Conn. The principles and structure of the Wiegand sensor are disclosed in Wiegand U.S. Pat. No. 3,820,090 granted Jun. 25, 1974 and Wiegand U.S. Pat. No. 4,247,601 granted Jan. 27, 1981. The Wiegand sensor utilizes a bistable feromagnetic wire of generally uniform composition having a central magnetically soft core portion and an outer magnetically hard shell portion with relatively low and high coercivity respectively. The shell portion is permanently magnetized and operates to magnetize the core portion in a first direction (the "confluent state") in the absence of an external magnetic field. The magnetization of the core portion is reversible by the application of an external magnetic field so that the core and shell have opposite polarity (the "reverse state") when the external field is removed the magnetization of the core is changed to the first direction by the effect of the shell portion. Thus, by manipulating the external magnetic field excursions, the shell and core can be switched to the confluent or reverse states of magnetic polarity. The polarity switching occurs abruptly. For use as a pulse generator, a sensing coil is wrapped around the Wiegand wire and the sensor comprises a two wire device that requires no power. The sensing coil develops signal pulses of two or three volts in magnitude and twenty microseconds in duration and can operate with a pulse rate up to twenty KHz. It is suitable for very low speed operation as well and is operable over a wide range of temperature.

Figure 3:
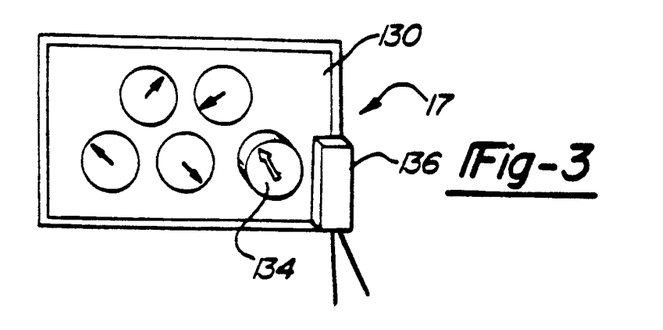
FIG. 3 is a diagrammatic showing of a meter sending unit.
Figure 4:
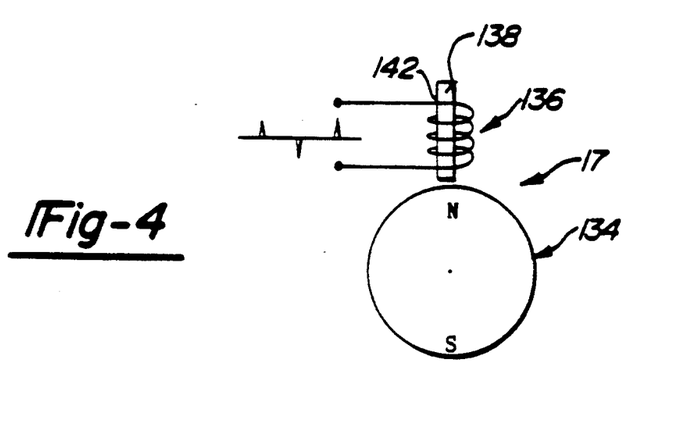
FIG. 4 is a representation of a Wiegand type sensor in the sending unit.

A meter sending unit 17 is shown diagrammatically in FIGS. 3 and 4. FIG. 3 shows a typical meter such as a gas meter with a panel 130 having five different dial indicators of the rotary hand type, each different hand representing a different digit in the meter reading. The hand representing the least significant digit is replaced with a rotary two-pole permanent magnet 134 and a Wiegand sensor 136 is disposed adjacent the rotary magnet. The Wiegand sensor 136 and the rotary magnet 134 are shown in FIG. 4. The Wiegand wire 138 is wrapped with a sensing coil 142. The rotary magnet wheel 134 is located so that its magnetic field is effective to switch Wiegand wire from the confluent state to the reverse state and allows it to switch back to the confluent state as it rotates through one revolution. Accordingly, meter pulses of alternate polarity are generated in the coil 142 as shown in the waveform diagram of FIG. 4.

The sensor of each meter sending unit 17 is coupled through a meter interface circuit with the input of the multiplexer 102, as shown in FIG. 2. The interface circuit comprises a transistor 110 having its base connected through a resistor to the output terminal of the Wiegand wire sensor. The diode across the base bypasses the negative pulses and the positive pulses are effective to turn on the transistor 110. The collector of the transistor is connected with one of the input ports X1, X2, X3 or X4 of the multiplexer 102. The collectors are also coupled through a large resistor 111 to the base of the transistor 120 so that as a pulse, at ground potential, is applied to the multiplexer by a meter sending unit, a similar pulse turns on the transistor 120 to activate the processor 100.

The data input ports of the multiplexer 102 are selectively coupled to the port I1 of the processor. The four meter sending units 17 are coupled through individual signal conditioning circuits 108, as discussed above, to one of the input ports X1, X2, X3 or X4 of the multiplexer 102. The command signal issued by the SAU is transmitted over the telephone line as a sequence of tone bursts at 1633 Hz. This signal is derived from the filter capacitor 63 and inductor 64 and applied through transistor 68 to the input port X0 of the multiplexer. The input at port X0 is at logic low during each tone burst. A tamper detector terminal is coupled through a transistor 122 to the data input port X6 of the multiplexer. When the terminal is grounded, the input at port X6 is at logic high. DTR terminals DTR 1, 2 and 3 are provided for connection to an installers portable field unit to initialize registers in the processor and perform tests at the time of installation. The terminals DTR 2 and 3 are connected to input ports I0 and G0 respectively on the processor for receiving and transmitting data, respectively. The terminal DTR 1 is coupled through a resistor and conductor 124 to the port X5 of the multiplexer. These other inputs, like the meter sending units 17, are coupled to the base of the transistor 120 through resistors 111 to activate the RESET when a pulse occurs. The multiplexer 102 operates under control of the processor 100 to provide the input signals to the processor as they occur and, if more than one occurs simultaneously, to present them in a prescribed order. When a pulse occurs it is applied to a multiplexer input and also through the transistor 120 to activate the processor. The processor then sweeps through a series of seven 3 bit codes, one for each NUX input, applying them to the multiplexer via ports L0, L1 and L2. When the code matches a MUX input at ground potential an output pulse is sent to the port I1 of the processor. The processor acts on the pulse according to its source.

The processor 100 has a port D3 coupled to the base of a transistor 112 which connects Vcc to the tone generator 104 to supply power thereto. To supply data to the tone generator the processor energizes a tone enable output port L4 and a four bit data output at the ports L0 through L3. The tone generator, in turn has an output port coupled to the base of a transistor 114 which is connected to modulate the load current on the transistors 54 and 55.

Figure 5:
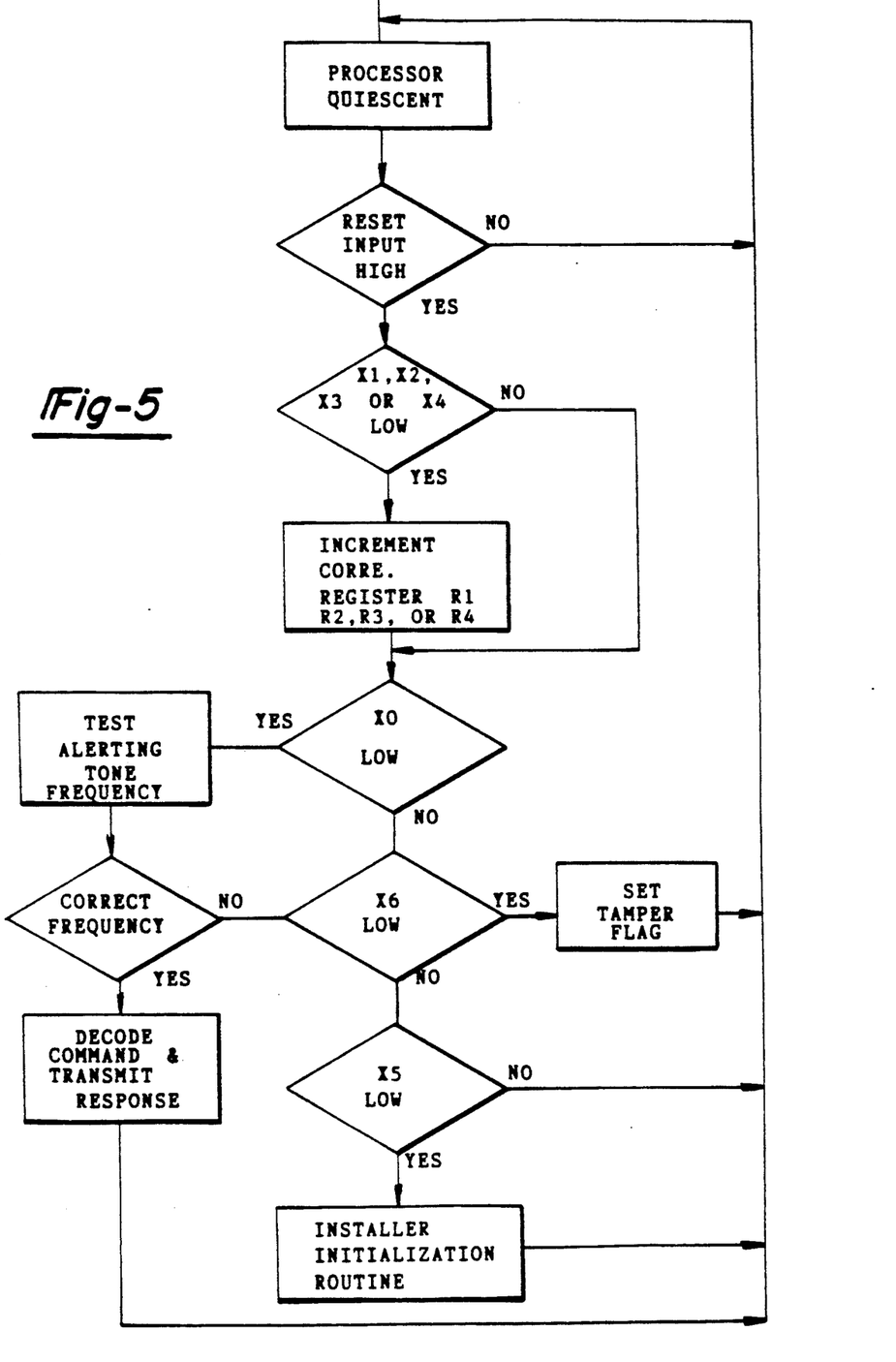
FIG. 5 is a flow chart representing a part of the control program of the microprocessor.
Figure 6:
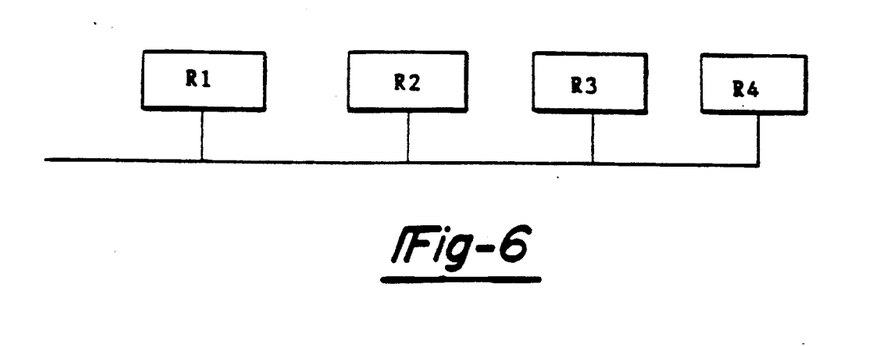
FIG. 6 depicts storage registers in the RAM of the microprocessor.

In operation the RSU is powered by the telephone line 10 but the power requirements are extremely small. The RSU has a very high input impedance (at least 5 megohms) during idle state. Except when receiving inputs or when interrogated by the SAU, the processor 100 remains in the quiescent or halt mode and draws less than 1 microamp. When a pulse is emitted by a sender 17, the multiplexer 102 receives the pulse on input port X0, X1, X2 or X3 and the RESET port of the processor receives a logic high input to activate the processor. Similarly when a command signal, tamper signal or DTR signal is received on input ports X0, X5 or X6, the processor is activated. The processor sends a sequence of 3 bit codes to the MUX which operates to serially couple to the processor port I1 any input pulses which are present on the inputs of the MUX when their corresponding codes are received from the processor on the MUX ports A, B and C. When a meter pulse is emitted by a sender 17, the processor responds to the pulse by incrementing a count in RAM at an address reserved as a register for the meter identified by the particular code. The registers in RAM are depicted in FIG. 6 as R1, R2, R3 and R4, corresponding to meters 1, 2, 3 and 4, respectively. Then the processor returns to the halt mode and awaits another event. Information is stored in a similar manner for the tamper detection or installation input. Thus the processor itself serves as the data storage medium for the meter reading and other data. When it is time to report the data to the utility company no search or interrogation of the sources of the data, such as the meters, is required. The command signal tones received from the telephone line are presented to the processor in the same way. The operation as described above is performed by the processor under control of the program stored in ROM. The relevant part of the control program is represented by the flow chart of FIG. 5.

When the SAU issues a control signal via the telephone line, it does so by a series of tone bursts at a frequency of 1633 Hz. The initial tone signal is an alert signal. The initial or alert signal, if acknowledged, is followed by command signal which identifies the meter number. The number of tone bursts in each signal is the code for a particular function. The filter 63, 64 passes that tone to the transistors 68 and 120 which, in turn, pass it to the multiplexer 102 and to the RESET port of the processor. The multiplexer 102 passes the tone to the processor port Il as described above. After determining that a tone is present the processor will keep itself activated by supplying the latching signal from the port DO. The processor verifies the frequency by monitoring the level transitions of the tone. The frequency verification is performed by the processor under program control as represented by the flow chart of FIG. 5. If the frequency is incorrect, the processor will turn off, otherwise, the processor will turn on the tone generator 104 through transistor 112 by resetting port D3. Then the generator outputs an acknowledge burst in the form of a DTMF tone pair which is a mix of two preset frequencies. The tone pair modulates the load current drawn by the RSU via the transistors 114, 55 and 54 and that modulation is sensed by the SAU and decoded. Then a command signal of 1, 2, 3 or 4 requests the reading of the corresponding meter.

When a meter reading is requested the processor outputs a series of digits to the tone generator 104. The DTMF protocol provides 8 fixed frequencies combined in 16 tone pairs representing the decimal digits and six other characters. The meter reading, as accumulated in the corresponding register in the processor RAM, is output in a binary coded decimal format. Each decimal digit is represented by a four bit code which is translated by the tone generator into a tone pair unique to the digit value. The meter reading is accompanied by other data which is output as a series of DTMF tones representing decimal digits. Tones representing other characters are used for the message header and terminator. The complete response is typically as follows: message header (1 digit), meter type (2 digits), customer account number (8 digits), wake command echo (3 digits), meter reading (10 digits), tamper indication (1 digit), error code indication (2 digits), checksum value (3 digits), and a message terminator (1 digit). The tones are 70 to 90 msec long and are separated by pauses of the same length.

A busy detection function is provided by the 24 volt zener diode 50. When a telephone is taken off-hook, the voltage across the tip and ring terminals drops to 24 volts or less. At this level the diode 50 inhibits input current and no voltage is present at the port I2 of the processor which prevents any tone output.

Tamper indication is used to recognize an event such as opening the RSU housing or disconnecting the wires. When such an event is detected an appropriate flag is set in the processor and is read out along with the meter reading.

It will thus be seen that the invention provides an inexpensive remote meter reader which produces data outputs for telephone transmission with the highest integrity, operates at extremely low power levels, and is flexible to perform auxiliary functions as well.

Although the description of this invention has been given with reference to a particular embodiment, it is not to be construed in a limiting sense. Many variations and modifications of the invention will now occur to those skilled in the art. For a definition of the invention reference is made to the appended claims.

The embodiments of the invention in which an exclusive property or privilege is claimed are defined as follows:

1. For use in a meter reading system using a telephone line for communication of meter data, a transponder comprising:
   detecting means for detecting a control signal on the telephone line, said control signal being comprised of a tone frequency,
   a microprocessor including a read/write memory,
   a meter pulse generating means coupled with said meter for producing an electrical meter pulse corresponding to a predetermined meter event,
   first coupling means for coupling the meter pulse generating means to the microprocessor,
   means for switching the microprocessor from a quiescent mode to an active mode in response to said meter pulse,
   the microprocessor being programmed to count pulses from said meter pulse generating means and for storing the pulse count in said read/write memory, and for switching the microprocessor to the quiescent mode after the pulse count is stored,
   a data signal generator coupled with the microprocessor,
   second coupling means for coupling said detecting means to said microprocessor,
   and means for switching the microprocessor from the quiescent to the active mode in response to said control signal which is comprised of said tone frequency, said microprocessor being programmed to determine whether said tone frequency is equal to a predetermined frequency and, if it is not, to switch said microprocessor to said quiescent mode, and if it is, to cause said data signal generator to transmit encoded data representing the pulse count stored in the read/write memory in response to a command signal and for switching the microprocessor to the quiescent mode after the encoded data signal is transmitted.

2. The invention as defined by claim 1 wherein said data signal generator is a DTMF tone generator.

3. The invention as defined in claim 2 wherein:
   the pulse count stored in said read/write memory is formatted as sequence of binary coded decimal numbers,
   and the DTMF tone generator generates a unique tone pair for each of said numbers whereby the pulse count is transmitted as a sequence of tone pairs.

4. The invention as defined in claim 1 wherein:
   said first coupling means comprises a multiplexer circuit and a reset circuit each having an input coupled with the meter pulse generating means, the reset circuit having an output coupled to a reset input of the microprocessor for switching the microprocessor from the quiescent mode to the active mode in response to said meter pulse and for switching it to the quiescent mode after the occurrence of said meter pulse,
   and means responsive to said pulse for incrementing a pulse count register in the read/write memory.

5. For use in a meter reading system using a telephone line for communication of meter data, a transponder comprising;
   detecting means for detecting a control signal on the telephone line,
   a microprocessor including a read/write memory,
   a meter pulse generating means coupled with said meter for producing an electrical meter pulse corresponding to a predetermined meter event,
   first coupling means for coupling the meter pulse generating means to the microprocessor, said first coupling means comprises a multiplexer circuit and a reset circuit each having an input coupled with the meter pulse generating means, the reset circuit having an output coupled to a reset input of the microprocessor for switching the microprocessor from a quiescent mode to an active mode in response to said meter pulse and for switching it to the quiescent mode after the occurrence of said meter pulse, a tamper detector coupled with an input of said multiplexer for applying a logic signal thereto in response to tampering with a circuit of said transponder, means for switching the microprocessor from the quiescent mode to the active mode in response to said meter pulse, a data signal generator coupled with the microprocessor, said microprocessor having means for interrogating said multiplexer when in an active mode to increment a pulse count register in the read/write memory and to set a tamper flag in said read/write memory, second coupling means for coupling said detecting means to said microprocessor, and means for switching the microprocessor from the quiescent to the active mode in response to said control signal, said microprocessor being programmed to cause said data signal generator to transmit encoded data representing the pulse count and said tamper flag stored in the read/write memory in response to a command signal and for switching the microprocessor to the quiescent mode after the encoded data signal is transmitted.

6. The invention as claimed in claim 5 wherein:

said tamper detector has a tamper responsive circuit with a terminal for producing said logic signal in response to said tampering, said multiplexer circuit and said reset circuit each having an input coupled with said terminal, whereby said microprocessor is switched from the quiescent mode to the active mode in response to said logic signal from said tamper detector and is switched to the quiescent mode after the occurrence of said logic signal.

* * * * *